(12) United States Patent
Kleber et al.

(10) Patent No.: US 8,511,367 B2
(45) Date of Patent: Aug. 20, 2013

(54) METHOD AND APPARATUS FOR FABRICATING A ROTOR FOR AN INDUCTION MOTOR

(75) Inventors: Richard M. Kleber, Clarkston, MI (US); Michael J. Walker, Windsor (CA); Qigui Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 12/791,009

(22) Filed: Jun. 1, 2010

(65) Prior Publication Data

US 2011/0291517 A1 Dec. 1, 2011

(51) Int. Cl.
*B22D 19/00* (2006.01)

(52) U.S. Cl.
USPC .......................................... 164/109; 164/112

(58) Field of Classification Search
USPC ................. 164/108, 109, 110, 112, 332, 333, 164/334
See application file for complete search history.

(56) References Cited

U.S. PATENT DOCUMENTS

| 2,368,295 | A | * | 1/1945 | Goran | 164/109 |
|---|---|---|---|---|---|
| 2,998,638 | A | * | 9/1961 | MacLaren | 29/598 |
| 3,264,695 | A | * | 8/1966 | Summers et al. | 164/109 |
| 4,777,396 | A | | 10/1988 | Ito et al. | |
| 4,970,424 | A | | 11/1990 | Nakamura et al. | |
| 5,861,700 | A | | 1/1999 | Kim | |
| 7,851,961 | B2 | * | 12/2010 | Lang et al. | 310/211 |
| 2003/0062786 | A1 | * | 4/2003 | Reiter et al. | 310/156.08 |
| 2007/0075603 | A1 | * | 4/2007 | Whiddon | 310/211 |
| 2008/0272667 | A1 | * | 11/2008 | Ionel et al. | 310/156.83 |
| 2009/0079289 | A1 | * | 3/2009 | Lang et al. | 310/214 |
| 2011/0198964 | A1 | * | 8/2011 | Biederman et al. | 310/211 |

* cited by examiner

*Primary Examiner* — Kevin P Kerns

(57) ABSTRACT

A method for forming a rotor for an induction motor includes providing a rotor core including a plurality of conductor bar grooves having first and second ends corresponding to first and second ends of the rotor core wherein the conductor bar grooves are progressively larger closer to the ends of the conductor bar grooves. The rotor core is placed into a casting mold, and molten metal is introduced into a first end of the casting mold. The molten metal flows from the first end of the casting mold through the plurality of conductor bar grooves to a second end of the casting mold. The molten metal solidifies to form conductor bars in the plurality of conductor bar grooves and to form shorting rings across exterior portions of the end elements within the first and second ends of the casting mold.

6 Claims, 4 Drawing Sheets

METHOD AND APPARATUS FOR FABRICATING A ROTOR FOR AN INDUCTION MOTOR

TECHNICAL FIELD

This disclosure is related to rotors for induction motors.

BACKGROUND

The statements in this section merely provide background information related to the present disclosure and may not constitute prior art.

An electric-powered induction motor transforms electric power to mechanical power by inducing rotating magnetic fields between a static element, i.e., a stator, and a rotatable element, i.e., a rotor. The rotating magnetic fields generate torque on a shaft of the rotor through conductor bars. Known stators can induce current flows through conductor bars on the rotor that may be parallel to an axis of the motor.

A known rotor for an induction motor includes a stack of steel sheets assembled onto a rotatable shaft, and a plurality of conductor bars fabricated from conductive material, e.g., copper or aluminum. The conductor bars are preferably connected at both axial ends of the rotors using shorting rings.

Known rotor fabrication methods include assembling the laminated steel stack and molding shorting rings and conductor bars on an outer periphery of the rotor. This includes placing the laminated steel stack into a casting mold, e.g., a die cast mold having a plurality of casting cavities. Molten material is introduced into open spaces formed in the rotor and open spaces between the die cast mold and the laminated steel stack to form the shorting rings and conductor bars.

It is known that oxide inclusions and voids can be formed in the conductor bars and shorting end rings during mold filling of molten material and solidification. Molten material may be introduced into the mold at single or multiple locations. For example, in high pressure die casting process, molten material is injected under pressure though open slots formed in the laminated steel stack, e.g., a plurality of conductor bar grooves, and flows to open spaces between the die cast mold and ends of the laminated steel stack to form shorting end rings. The molten material injected into the die casting mold flows from a relatively large volume occurring at the first shorting end ring through the plurality of conductor bar grooves and to the second, remote shorting end ring. The molten material can cool and partially solidify during turbulent flow of the molten material into the plurality of conductor bar grooves due in part to exposure to surface areas of the conductor bar grooves. The partially solidified molten material may impede molten material flow and cause voids, oxide inclusions, and other discontinuities in the conductor bars and the shorting end rings.

Power density output from an electric induction motor correlates to quality of the conductor bars, and mass bulk density of the individual conductor bars. It is known that voids formed in the conductor bars and the shorting end rings during fabrication reduce power density output of the electric induction motor. The presence of oxide inclusions and cracks due to hot tearing reduces the electric conductivity of the conductor bars and shorting end rings.

SUMMARY

A method for forming a rotor for an induction motor includes providing a rotor core including a plurality of conductor bar grooves having first and second ends corresponding to first and second ends of the rotor core wherein the conductor bar grooves are progressively larger closer to the ends of the conductor bar grooves. The rotor core is placed into a casting mold, and molten metal is introduced into a first end of the casting mold. The molten metal flows from the first end of the casting mold through the plurality of conductor bar grooves to a second end of the casting mold. The molten metal solidifies to form conductor bars in the plurality of conductor bar grooves and to form shorting rings across exterior portions of the end elements within the first and second ends of the casting mold.

BRIEF DESCRIPTION OF THE DRAWINGS

One or more embodiments will now be described, by way of example, with reference to the accompanying drawings, in which.

DETAILED DESCRIPTION

Figure 1:
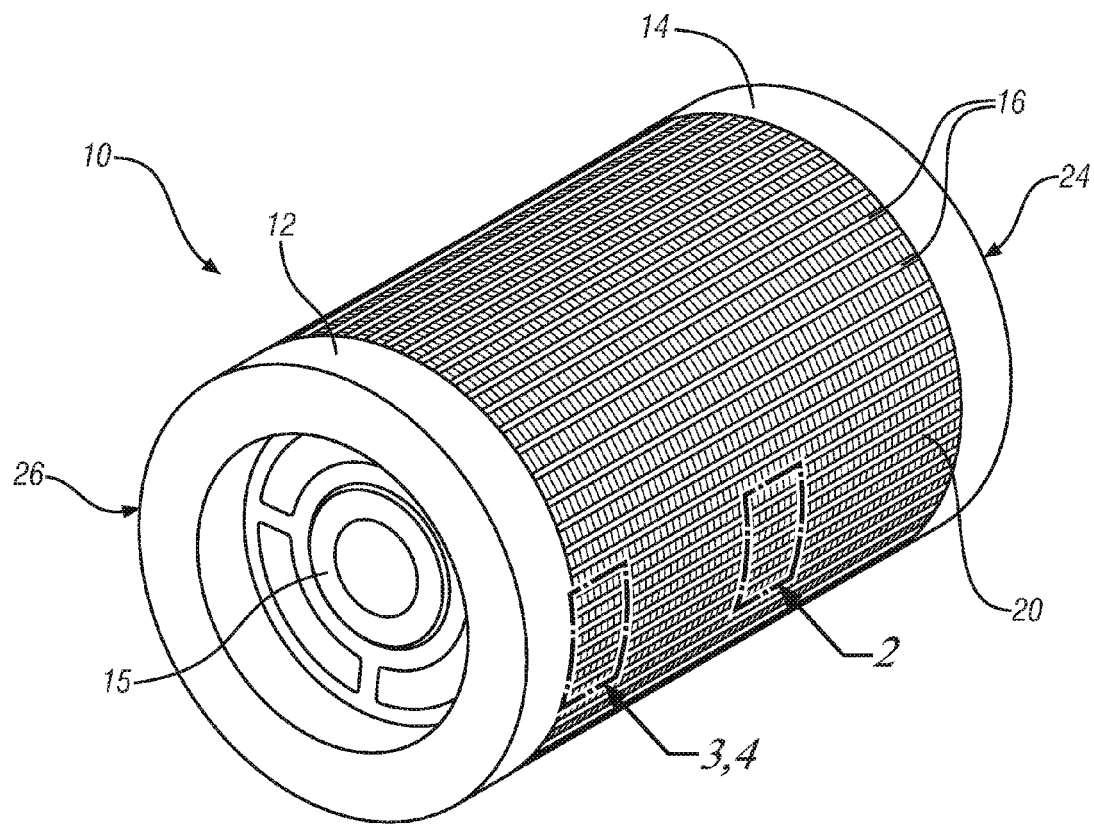
FIG. 1 schematically illustrates a rotor assembly for an induction motor in accordance with the disclosure.

Referring now to the drawings, wherein the showings are for the purpose of illustrating certain exemplary embodiments only and not for the purpose of limiting the same, FIG. 1 schematically illustrates a rotor assembly 10 for an induction motor. The induction motor can be any induction motor, with one application including an induction motor for use on a powertrain system for a motor vehicle. The rotor assembly 10 is fixedly attached to a shaft portion 15 using any suitable device. It is appreciated that the shaft portion 15 may be any suitable rotatable element, e.g., a shaft device, or a gear element of a planetary gear set for a transmission. The rotor assembly 10 and shaft portion 15 are configured to be assembled into and rotate within an induction motor.

The rotor assembly 10 includes a rotor core including an assembled steel laminate stack 20 and a plurality of radially-oriented conductor bars 16 electrically connected to annular-shaped shorting rings 12 and 14 at both ends 24, 26. The conductor bars 16 and shorting rings 12 and 14 are preferably formed on the assembled steel laminate stack 20 using a casting process. The conductor bars 16 and annular-shaped shorting rings 12 and 14 are formed from conductive material, e.g., copper or aluminum.

Figure 2:
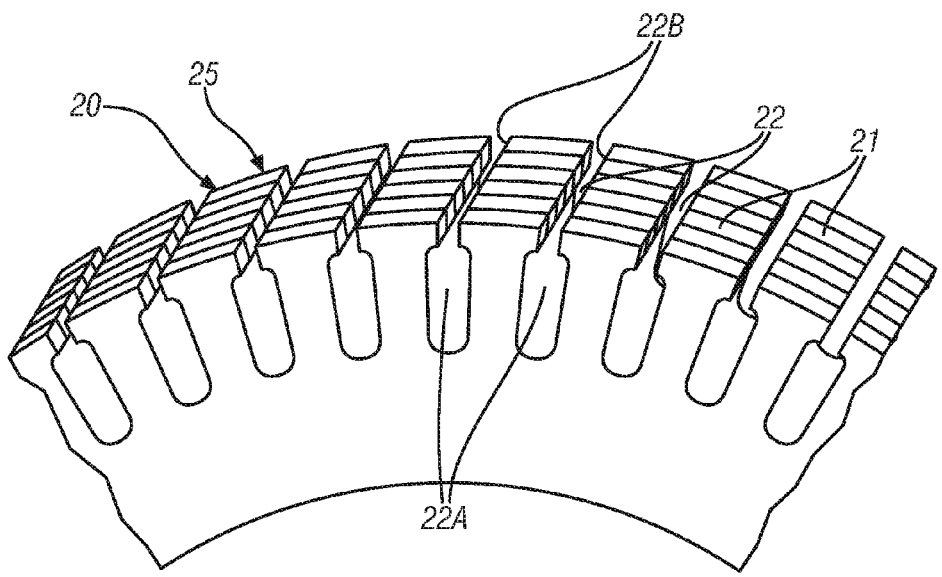
FIG. 2 is a partial isometric drawing depicting a portion of an assembled steel laminate stack having a plurality of apertures in accordance with the disclosure.

FIG. 2 shows an isometric view of a partial section of a center portion of the assembled steel laminate stack 20. The assembled steel laminate stack 20 is fabricated using a plurality of thin flat steel sheets 21. The sheets 21 are stamped using a fine blanking process and are electrically insulated. Each of the sheets 21 is a flat annular-shaped device formed from ferric material and including a plurality of radially-oriented apertures 22A. In one embodiment the sheets 21 are 0.33 mm (0.013 inches) thick. The apertures 22A are fabricated near an outer periphery 25 of each of the sheets 21. The apertures 22A can have any suitable cross-sectional shape, and are substantially rectangular-shaped in one embodiment. The apertures 22A include open portions 22B on the periphery 25. As is appreciated, the sheets 21 are assembled onto the shaft portion 15 in a laminated fashion using any suitable fabricating method. The apertures 22A and associated open portions 22B are aligned to form radially-oriented conductor bar grooves 22 on the periphery 25 that are preferably parallel to an axis of the shaft 15.

Figure 3A:
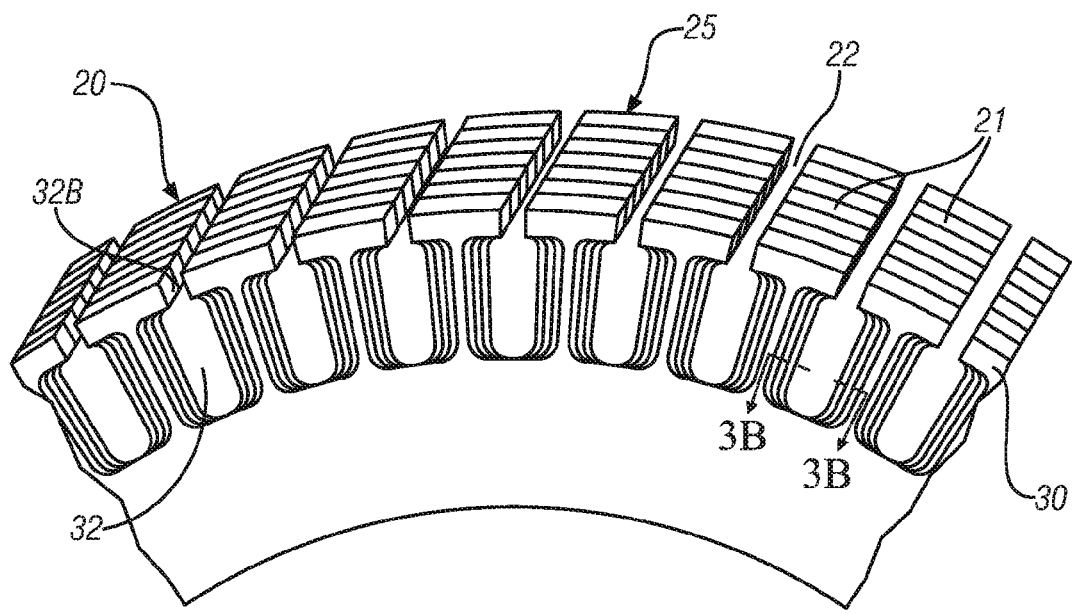
FIGS. 3A and 3B are partial isometric and top-view drawings, respectively, depicting a first embodiment of an assembled steel laminate stack including an end element having a plurality of tapered apertures in accordance with the disclosure.

FIG. 3A shows an isometric view of a partial section of an end portion of the assembled steel laminate stack 20 including a first embodiment of an end element 30. Preferably, end elements 30 are assembled onto both the first and second ends 24 and 26 of the assembled steel laminate stack 20. Each end element 30 has a plurality of tapered apertures 32, with each tapered aperture 32 corresponding to and aligned with one of the plurality of radially-oriented conductor bar grooves 22. The tapered apertures 32 have open portions 32B on the periphery 25.

Figure 3B:
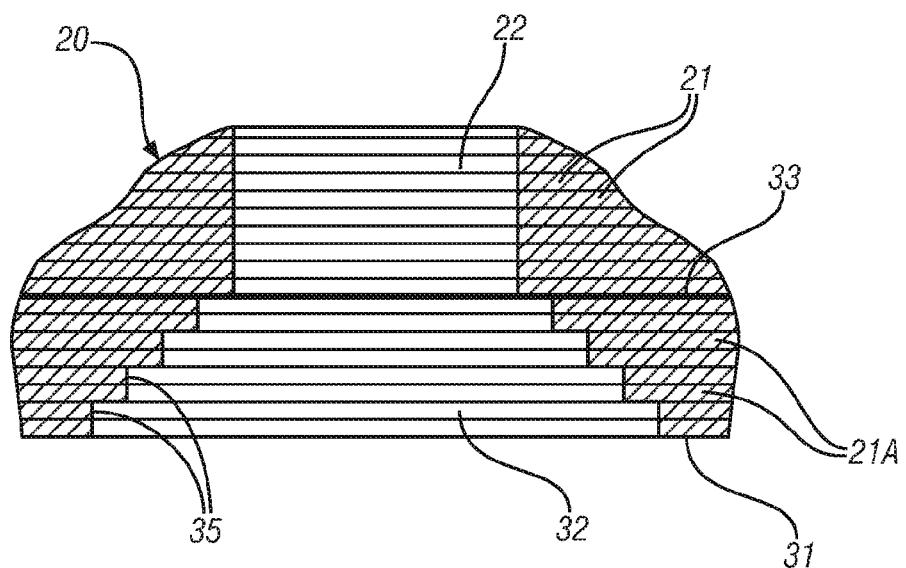

FIG. 3B shows a partial top-perspective view of the end portion of the assembled steel laminate stack 20 including the first embodiment of the end element 30. A single one of the tapered apertures 32 is depicted. The tapered aperture 32 is an aperture that tapers, or diminishes in open area from a first, outer surface 31 to a second, inner surface 33. The second surface 33 is contiguous to an end one of the plurality of flat steel sheets 21. The tapered apertures 32 are aligned with the plurality of radially-oriented conductor bar grooves 22 with a cross-sectional shape substantially equal to the apertures 22A that form the conductor bar grooves 22 in the assembled steel stack 20. The first embodiment of the tapered aperture 32 includes a stepwise reduction in open area from the first surface 31 to the second surface 33, and includes a plurality of discrete reductions (i.e. steps and corresponding plateaus 35) that emulates tapering. In one embodiment the discrete steps and corresponding plateaus 35 are formed using a plurality of layers of thin flat steel sheets 21A having apertures that successively diminish in a stepwise manner in their respective open areas. In one embodiment, there are four discrete steps and corresponding plateaus 35, with each of the discrete steps configured using six thin flat steel sheets 21A, thus providing steps that are about 2 mm (0.078 in) thick when the thin flat steel sheets 21A are 0.33 mm (0.013 in) thick.

Figure 4A:
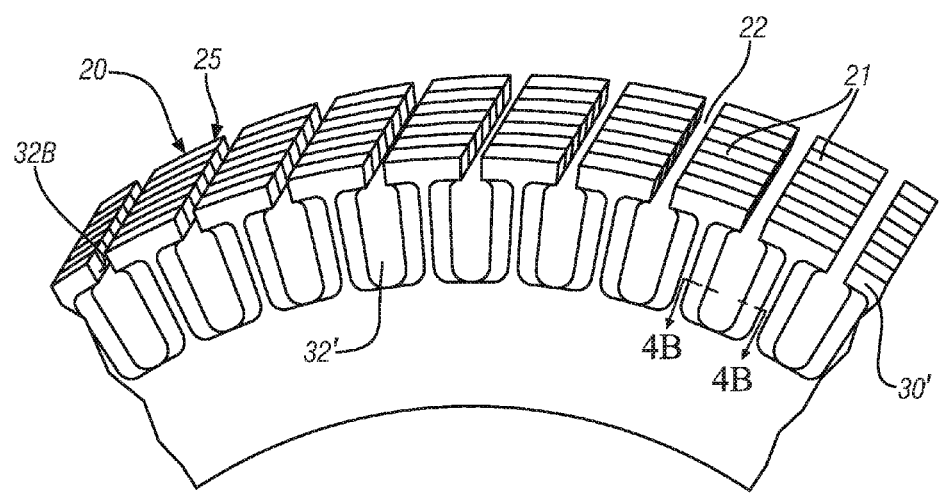
FIGS. 4A and 4B are partial isometric and top-view drawings, respectively, depicting a second embodiment of an assembled steel laminate stack including an end element having a plurality of tapered apertures in accordance with the disclosure.

FIG. 4A shows an isometric view of a partial section of an end portion of the assembled steel laminate stack 20 including a second embodiment of the end element 30'. Preferably, end elements 30' are assembled onto both the first and second ends 24 and 26 of the assembled steel laminate stack 20. Each end element 30' has a plurality of tapered apertures 32', with each tapered aperture 32' corresponding to and aligned with one of the plurality of radially-oriented conductor bar grooves 22. The tapered apertures 32' have open portions 32B on the periphery 25.

Figure 4B:
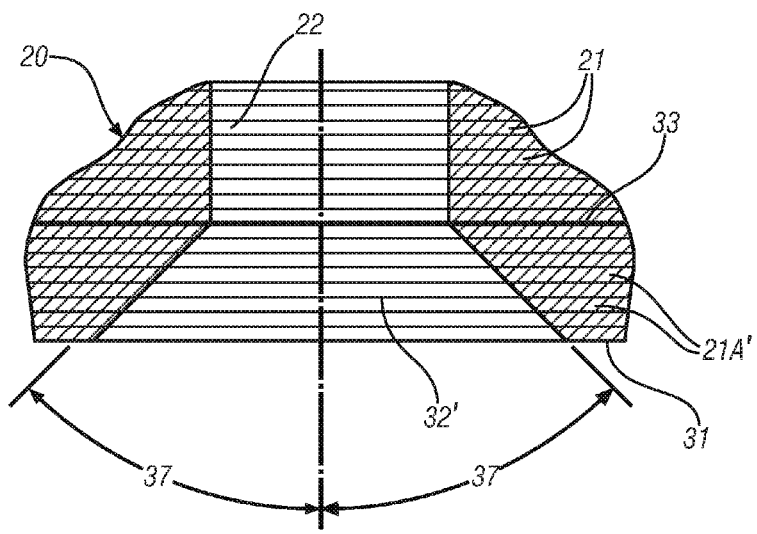

FIG. 4B shows a partial top-perspective view of the end portion of the assembled steel laminate stack 20 including the second embodiment of the end element 30'. A single one of the tapered apertures 32' is depicted. The tapered aperture 32 is an aperture that tapers, or diminishes in open area from the first, outer surface 31 to the second, inner surface 33, at a slope 37 that is defined relative to a longitudinal axis of the conductor bar grooves 22. The second surface 33 is contiguous to an end one of the plurality of flat steel sheets 21. The tapered apertures 32' are aligned with the plurality of radially-oriented conductor bar grooves 22 with a cross-sectional shape substantially equal to the apertures 22A that form the conductor bar grooves 22 in the assembled steel stack 20. The second embodiment of the tapered aperture 32' includes a continuous reduction in open area from the first surface 31 to the second surface 33. In one embodiment the tapered aperture 32' is formed using a tapered end mill cutting tool element. In one embodiment the tapered aperture 32' is formed using a cone-shaped punch element having a cross-sectional shape that is analogous to the apertures 22A. In one embodiment the cone-shaped punch element is used to form blank sheets having beveled apertures 21A' that are stacked as the end element 30 to form the tapered apertures 32'.

Figure 5:
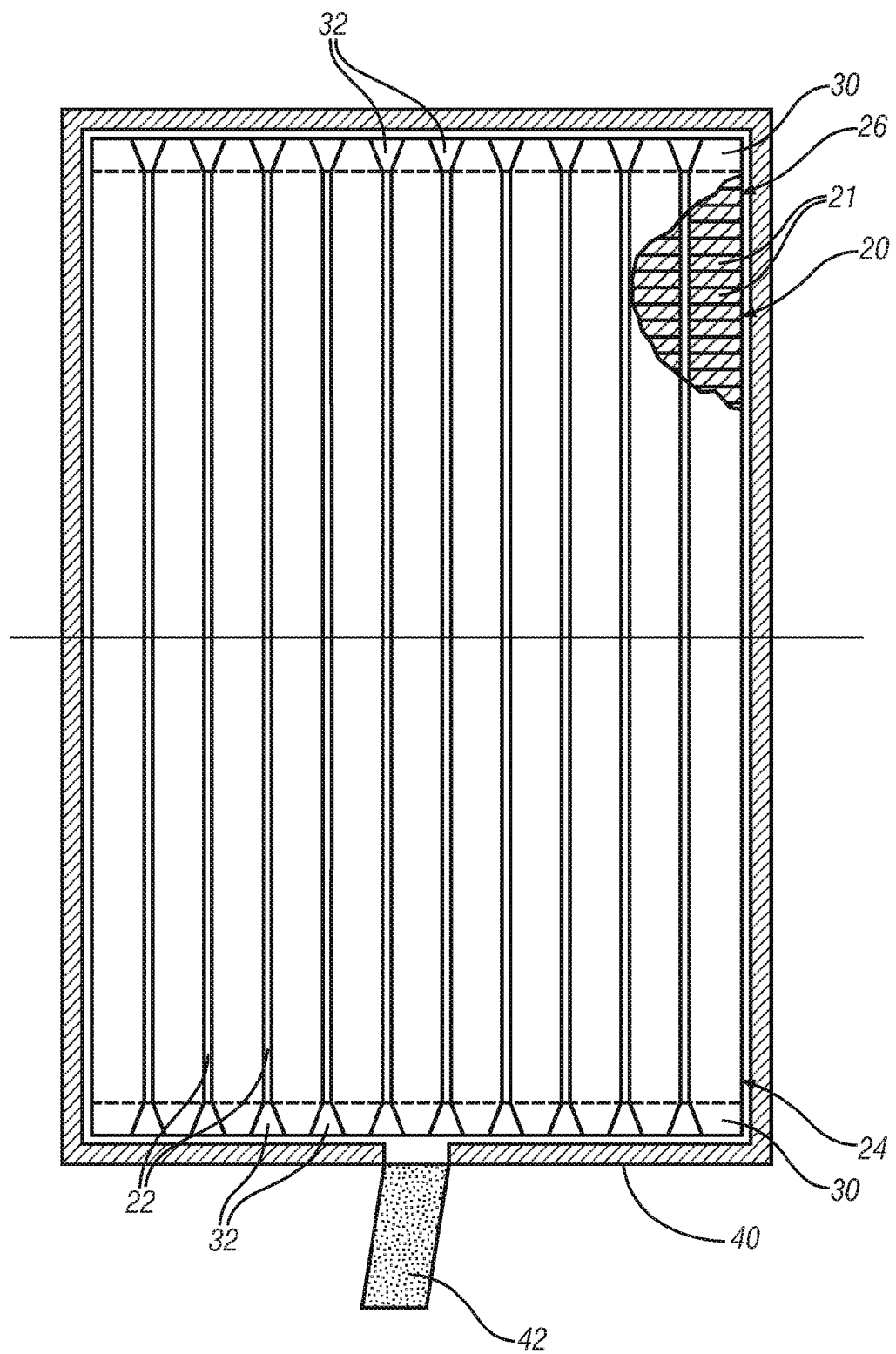
FIG. 5 is a two-dimensional side-view schematic drawing showing an assembled steel laminate stack inserted into a casting mold in accordance with the disclosure.

FIG. 5 schematically shows the assembled steel laminate stack 20 placed in a casting mold 40, which can include the assembled steel laminate stack 20 being inserted into a die cast mold 40 in one embodiment. As shown, the die cast mold 40 is oriented vertically, with an inlet 42 for introducing molten metal on a first or bottom end 24 of the mold. Introducing molten metal into a die cast mold is performed in any suitable manner, including, e.g., pressurized injection. It is appreciated that the die cast mold 40 may be oriented horizontally or another suitable orientation.

A manufacturing process for producing the rotor assembly 10 includes placing the assembled steel laminate stack 20 into a die casting machine including the die cast mold 40 to cast the conductor bars 16 and the annular-shaped shorting rings 12 and 14 using molten metal that is electrically conductive, e.g., aluminum or copper. The molten metal is processed and used to fill the casting mold 40 using any suitable material preparation and filling methods, e.g., pressurized injection. The assembled steel laminate stack 20 is encased in the molten metal during the process, thus locking all the components into a unitary structure. The molten metal is introduced near the first end 24 of the mold, e.g., at inlet 42, and preferably initially fills the annular-shaped shorting ring 12. As additional molten material is introduced, the pressure of the injection pushes the molten material up through the tapered apertures 32 formed into the first of the end elements 30 to fill the conductor bar grooves 22, and through the tapered apertures 32 formed into the second of the end elements 30 to fill the annular-shaped shorting ring 14. The conductor bars 16 are formed by filling the conductor bar grooves 22 with the molten material during the process, thereby electrically and structurally connecting the annular-shaped shorting rings 12 and 14. In one embodiment, the conductor bar grooves 22 are narrow at the outer surface, i.e., at the open portions 22B on the periphery 25 of the assembled steel laminate stack 20, and preferably widen into a more generous profile closer to the axial center of the assembled steel laminate stack 20, consistent with the apertures 22A.

During the process of introducing molten material, the molten material flows through the casting mold 40 to form the shorting ring 12, and then flows through the tapered apertures 32 of one of the end elements 30 to the conductor bar grooves 22 to form the conductor bars 16. The flow of molten material through the tapered apertures 32 of one of the end elements 30 to the conductor bar grooves 22 reduces likelihood of turbulent flow of the molten material in the conductor bars 16, thus reducing or eliminating excessive cooling of the molten material during the injection. The reduced likelihood of turbulent flow of the molten material in the conductor bar grooves 22 reduces or eliminates partial solidification of the molten material having associated voids, discontinuities, and reduced bulk material density in the conductor bars 16. Resulting improvement in flow of molten material around and through the assembled steel laminate stack 20 in the casting mold 40 can result in a more homogeneous microstructure subsequently solidified material that forms the conductor bars 16 and the first and second shorting rings 12 and 14.

Forming the rotor assembly 10 for an induction motor includes assembling the laminated steel stack 20 having a plurality of flat steel sheets 21 and first and second ends 24 and 26. The flat steel sheets 21 each include apertures 22A that may be open or enclosed. The first and second ends 24 and 26 each include a plurality of tapered apertures 32 corresponding to the apertures 22A. The apertures 22A and the tapered apertures 32 form a plurality of radially-oriented conductor bar grooves 22 with increasing cross-section areas connecting to both shorting end rings 14 and 16. The laminated steel stack 20 is placed into the casting mold 40 and introducing molten metal that flows into cavities formed between the assembled steel laminate stack 20 and the casting mold 40. The molten metal may be introduced into the casting mold 40 under pressure, including e.g., high pressure die casting or low pressure die casting, or using externally generated forces, e.g., mechanical or electric-magnetic, or using gravity flow processes. The molten metal may flow from a cavity between the casting mold 40 and the first end 24 of the assembled steel laminate stack 20 through the tapered apertures 32, through the conductor bar grooves 22 and through the tapered apertures 32 at the second end 26 to a second cavity in the casting mold 40. The molten metal may instead simultaneously flow from both the first and the second ends 24 and 26 through the cavities and through the tapered apertures 32 to the conductor bar grooves 22. The filled molten metal in the cavities of the casting mold 40 solidifies to form conductor bars 16 in the conductor bar grooves 22 and solidifies to form shorting bars 12, 14 across exterior portions of the end elements 30 within the first and second ends 24 and 26 of the mold 40.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for forming a rotor for an induction motor, comprising:
    assembling a rotor core comprising stacking a plurality of steel laminations and stacking first and second end elements at respective opposite ends of the stacked plurality of steel laminations, wherein each of the plurality of steel laminations includes a plurality of apertures and the first and second end elements each includes a plurality of tapered apertures corresponding to the plurality of apertures, wherein the stacking aligns the apertures and the tapered apertures to form a plurality of conductor bar grooves, wherein stacking first and second end elements at respective opposite ends of the stacked plurality of steel laminations comprises for each end element stacking a set of steel laminations wherein each steel lamination of the set of steel laminations includes a plurality of apertures and wherein each aperture of each subsequently stacked one of the set of steel laminations is larger than the previously stacked one of the set of steel laminations whereby the plurality of tapered apertures of the first and second end elements are formed;
    placing the rotor core into a casting mold; and
    introducing molten metal into a first end of the casting mold, the molten metal flowing from the first end of the casting mold through the plurality of conductor bar grooves to a second end of the casting mold, the molten metal solidifying to form conductor bars in the plurality of conductor bar grooves and solidifying to form shorting rings across exterior portions of the end elements within the first and second ends of the casting mold.

2. The method of claim 1, wherein introducing molten metal into the first end of the casting mold includes the molten metal flowing from the first end of the casting mold through the plurality of tapered apertures of the first end element to the plurality of conductor bar grooves.

3. The method of claim 2, wherein introducing molten metal into the first end of the casting mold includes the molten metal flowing from the plurality of conductor bar grooves through the plurality of tapered apertures of the second end element to the second end of the casting mold.

4. The method of claim 1, wherein stacking first and second end elements at respective opposite ends of the stacked plurality of steel laminations comprises for each end element stacking a set of steel laminations wherein each steel lamination of the set of steel laminations includes a plurality of apertures, and further comprising for each end element machining the apertures of each steel lamination of the set of steel laminations to form the tapered apertures of the first and second end elements.

5. The method of claim 1, wherein placing the rotor core into a casting mold comprises inserting the rotor core into a vertical casting mold.

6. The method of claim 1, further comprising the tapered apertures at each of the first and second ends of the steel laminate stack comprising a set of flat steel sheets wherein each stacked flat steel sheet includes a beveled aperture.

\* \* \* \* \*